United States Patent [19]

Ikeda et al.

[11] Patent Number: 6,087,286
[45] Date of Patent: Jul. 11, 2000

[54] DIELECTRIC CERAMIC COMPOSITION, DIELECTRIC CERAMIC MATERIAL AND ITS PRODUCTION METHOD, DIELECTRIC DEVICE AND ITS PRODUCTION METHOD

[75] Inventors: Masaaki Ikeda, Chiba; Takeshi Takahashi, Tokyo; Makoto Kobayashi, Chiba, all of Japan

[73] Assignee: TDK Corporation, Tokyo, Japan

[21] Appl. No.: 08/991,305

[22] Filed: Dec. 16, 1997

[30] Foreign Application Priority Data

Dec. 16, 1996 [JP] Japan .................................. 8-353183
Apr. 30, 1997 [JP] Japan .................................. 9-127998

[51] Int. Cl.⁷ .................................................. C64B 35/497
[52] U.S. Cl. ............................ 501/135; 428/469; 428/471
[58] Field of Search ............................ 501/135; 428/469, 428/471

[56] References Cited

U.S. PATENT DOCUMENTS 5,565,391  10/1996  Nakano et al. .

FOREIGN PATENT DOCUMENTS 0 589 441   3/1994   European Pat. Off. .
0 625 492  11/1994   European Pat. Off. .
52-87700    7/1977   Japan .
56-156609  12/1981   Japan .
4-325454   11/1992   Japan .
5-20925     1/1993   Japan .
6-283024   10/1994   Japan .
7-147111    6/1995   Japan .

*Primary Examiner*—Karl Group
*Attorney, Agent, or Firm*—Oblon, Spivak, McClelland, Maier & Neustadt, P.C.

[57] ABSTRACT

A dielectric material and a dielectric device is obtained using a dielectric ceramic composition which can be sintered at a temperature of up to 950° C. and having as a main phase a composite oxide of Pb, Ca, W, Fe and Nb, said composite oxide having a composition represented by $(Pb_{1-x}Ca_xO)_y (W_sFe_tNb_u)O_z$ where x, y, s, t, u, and z are $0.3 \leq x \leq 0.9$, $1.000 \leq y < 1.020$, $1.03 \leq (2s+u)/t \leq 1.40$, $s+t+u=1$, $0.05 \leq s \leq 0.20$, $0.2 \leq u \leq 0.49$ and $z=3s+5/2u+3/2t$. The composition can be co-sintered with silver, has low loss and a high dielectric constant, and makes it possible to prevent the entrance of a plating bath into a device.

10 Claims, 2 Drawing Sheets

DIELECTRIC CERAMIC COMPOSITION, DIELECTRIC CERAMIC MATERIAL AND ITS PRODUCTION METHOD, DIELECTRIC DEVICE AND ITS PRODUCTION METHOD

BACKGROUND OF THE INVENTION

The present invention relates to a dielectric ceramic composition, especially a dielectric ceramic composition suitable for forming resonators, etc. used in the microwave, and millimeter wave ranges including wavelengths of several hundred MHz to several tens GHz in particular, a dielectric ceramic material and its production method, and a dielectric device and its production method.

To meet recently increasing demands for mobile communications equipment represented by earphones, portable phones, and satellite communications as well as demands for ever-higher intelligence and performance, it is now strongly required to achieve size reductions and high performance regarding microwave devices used on mobile communications systems. By the term "microwave device" used herein is intended a dielectric device made up of a dielectric ceramic material, which has main applications in the microwave, and millimeter wave ranges and is used to form resonators, etc.

Such a microwave device is mounted on a substrate by surface mount technologies, and is required to include leading electrodes having good wettability by solder and less exposed to a solder attack upon mounted on the substrate, and stand up to mechanical, and thermal impacts upon mounted on the substrate.

The size of a microwave device built up of a conductor and a dielectric material is substantially inversely proportional to the square root of a dielectric constant $\epsilon$ of the dielectric material used, and Q, an index to device performance, is defined by the reciprocal of a loss factor. Although some correction is necessary depending on device architecture, Q is chiefly determined by $$1/Q = 1/Qc + 1/Qd$$

Here Qc is the reciprocal of a loss factor of the conductor portion and Qd is the reciprocal of a loss factor of the dielectric portion. To obtain a small-size yet low-loss microwave device suitable for surface mounting, therefore, it is required to increase the dielectric constant $\epsilon$ of the dielectric material and increase the reciprocals Qc and Qd of the loss factors of the conductor and dielectric portions, respectively.

Nickel plating is carried out to prevent a solder attack on electrodes upon mounting, and tin, lead and other plating is performed to improve wettability by solder. It is thus required to prevent product defects and degradation of device performance, which may otherwise be caused by popping, corrosion, etc. due to the entrance of a plating bath into devices at the nickel, tin, lead, and other plating step.

Here let f represent the frequency used. Qc decreases as f increases, and Qc decreases again as $\rho$ increases. Here $\rho$ is the specific resistance of a conductor that is a constant intrinsic to a conductor material. Empirically, it is known that f.Qd=C holds in the microwave, and millimeter wave ranges. Here C is a constant intrinsic to a dielectric material, called a Qf product. Qd is in inverse proportion to f but in direct proportion to C. To increase the Q of a device, therefore, it is most effective to decrease the $\rho$ of the conductor material. This effect is particularly true as the frequency f becomes high. The second best is to increase the C of a dielectric material.

However, a substance having the lowest specific resistance $\rho$ in a temperature range of –50 to 125° C. is silver. To increase the Q of a device, therefore, it is most effective to use silver for the conductor material, and the second best is to use a dielectric material having a large Qf product. In view of obtaining a low-loss device, it is here to be noted that even a dielectric material having a large Q value and a high dielectric constant is of industrially low value unless it can have a structure integral with silver having the lowest specific resistance $\rho$.

So far, $Ba(Mg_{1/3}Ta_{2/3})O_3$, $Ba(Zn_{1/3}Ta_{2/3})O_3$, etc. have been known as microwave dielectric materials having a high dielectric constant and a large Q value in the microwave, and millimeter wave ranges. However, these materials are found to have a sintering temperature of as high as 1,300° C. or higher, and so cannot be co-sintered with silver. The sintering temperature of the materials may be lowered by the addition of glass thereto, but the resulting materials are no longer practical because their dielectric constant is as low as about 10.

On the other hand, U.S. Pat. No. 5,459,115 (EP 0 589 441 A1) discloses a dielectric ceramic composition represented by

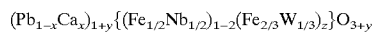

$$(Pb_{1-x}Ca_x)_{1+y}\{(Fe_{1/2}Nb_{1/2})_{1-z}(Fe_{2/3}W_{1/3})_z\}O_{3+y}$$

where x, z and y are $$0.43 < x \leq 0.63$$

$$0.0 < z \leq 0.5$$

$$0.0 \leq y \leq 0.20$$

However, this composition cannot be co-sintered with silver because of its high sintering temperature of the order of about 1,000 to 1,200° C., although its dielectric constant is of the order of 90 or higher. It is thus impossible to fabricate a device of the structure wherein a low-loss silver conductor is embedded in a dielectric material or, in another parlance, it is difficult to obtain a device having a large Q value.

U.S. Pat. No. 5,565,391 (EP 0 625 492 A1) discloses a dielectric ceramic material having as a major phase a composition comprising lead, calcium, tungsten, iron and niobium in the form of oxides and represented by

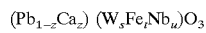

$$(Pb_{1-z}Ca_z)(W_sFe_tNb_u)O_3$$

where, on condition that s+t+u=1, z, s, t and u are $$0.3 \leq z \leq 0.9$$

$$0.01 \leq s \leq 0.2$$

$$0.5 \leq t \leq 0.6$$

$$0.2 \leq u \leq 0.49$$

This dielectric ceramic material has a high dielectric constant of the order of 90 or higher and a sintering temperature lower than the melting point of silver. However, no sufficient density is obtained unless the sintering temperature is elevated, not only resulting in electrode defects due to the evaporation of silver, excessive sintering, and the reaction of silver with the dielectric ceramic material, but also ending up with defects due to the entrance of a plating bath into a device, frequency variations, and Q value drops. To meet recently increasing demands for size reductions of communications equipment in the microwave, and millimeter wave ranges, there are strong demands for further size reductions of microwave devices by dielectric constant increases.

SUMMARY OF THE INVENTION

An object of the present invention is to provide a dielectric ceramic composition which can be co-sintered with silver, has low loss and a high dielectric constant, and can prevent the entrance of a plating bath thereinto.

The aforesaid object is achieved by the inventions defined below as (1) to (12).

(1) A dielectric ceramic composition having a sintering temperature of up to 950° C. and composed mainly of a composite oxide of lead, calcium, tungsten, iron and niobium, wherein:

said composite oxide has a composition represented by $$(Pb_{1-x}Ca_xO)_y(W_sFe_tNb_u)O_z$$

where x, y, s, t, u, and z are $0.3 \leq x \leq 0.9$ $1.000 \leq y < 1.020$ $1.03 \leq (2s+u)/t \leq 1.40$ $s+t+u=1$ $0.05 \leq s \leq 0.20$ $0.2 \leq u \leq 0.49$ $z=3s+5/2u+3/2t$ (2) A dielectric ceramic material which is composed mainly of a composite oxide as recited in (1) with lead germanate added thereto, and has been sintered at up to 950° C.

(3) The dielectric ceramic material of (2), which contains said lead germanate in an amount of 1 to 10 wt %.

(4) The dielectric ceramic material of (3), wherein said lead germanate contains $Pb_5Ge_3O_{11}$.

(5) The dielectric ceramic material of any one of (2) to (4), which further contains manganese oxide in an amount of up to 0.5 wt %, calculated as manganese, based on a total weight of said composite oxide.

(6) A method of producing a dielectric ceramic material, comprising steps of:

mixing, and calcining given amounts of oxides of lead, iron and tungsten or compounds of lead, iron and tungsten converted by sintering to oxides thereof to obtain a first calcined product, mixing, and calcining given amounts of oxides of lead, calcium, iron and niobium or compounds of lead, calcium, iron and niobium converted by sintering to oxides thereof to obtain a second calcined product, mixing, pulverizing, and calcining said first calcined product and said second calcined product to obtain a third calcined product having a final composition represented by $$(Pb_{1-x}Ca_xO)_y(W_sFe_tNb_u)O_z$$

where x, y, s, t, u, and z are $0.3 \leq x \leq 0.9$ $1.03 \leq (2s+u)/t \leq 1.40$ $s+t+u=1$ $0.05 \leq s \leq 0.20$ $0.2 \leq u \leq 0.49$ $1.000 \leq y \leq 1.020$ $z=3s+5/2u+3/2t$ mixing said third calcined product with lead germanate to obtain a dielectric ceramic composition, and shaping, and sintering said dielectric ceramic composition at a temperature of up to 950° C.

(7) A method of producing a dielectric ceramic material, comprising steps of:

mixing, and calcining given amounts of oxides of lead, calcium, iron and niobium or compounds of lead, calcium, iron and niobium converted by sintering to oxides thereof to obtain a second calcined product, mixing, pulverizing, and calcining said second calcined product with oxides of lead, iron and tungsten or compounds of lead, iron and tungsten converted by sintering to oxides thereof to obtain a third calcined product having a final composition represented by $$(Pb_{1-x}Ca_xO)_y(W_sFe_tNb_u)O_z$$

where x, y, s, t, u, and z are $0.3 \leq x \leq 0.9$ $1.03 \leq (2s+u)/t \leq 1.40$ $s+t+u=1$ $0.05 \leq s \leq 0.20$ $0.2 \leq u \leq 0.49$ $1.000 \leq y < 1.020$ $z=3s+5/2u+3/2t$ mixing said third calcined product with lead germanate to obtain a dielectric ceramic composition, and shaping, and sintering said dielectric ceramic composition at a temperature of up to 950° C.

(8) A method of producing a dielectric ceramic material as recited in (6) or (7), which contains said lead germanate in an amount of 1 to 10 wt %.

(9) A method of producing a dielectric ceramic material as recited in (8), wherein said lead germanate contains $Pb_5Ge_3O_{11}$.

(10) A method of producing a dielectric ceramic material as recited in any one (6) to (9), wherein said dielectric ceramic composition contains manganese oxide in an amount of up to 0.5 wt %, calculated as manganese, based on a total weight of said composite oxide.

(11) A dielectric device, wherein the dielectric ceramic material of any one of (2) to (5) has a built-in silver conductor pattern.

(12) A method of producing the dielectric device of (11) by co-sintering of the dielectric ceramic composition of (1) with silver.

DETAILED DESCRIPTION OF THE INVENTION

Figure 1:
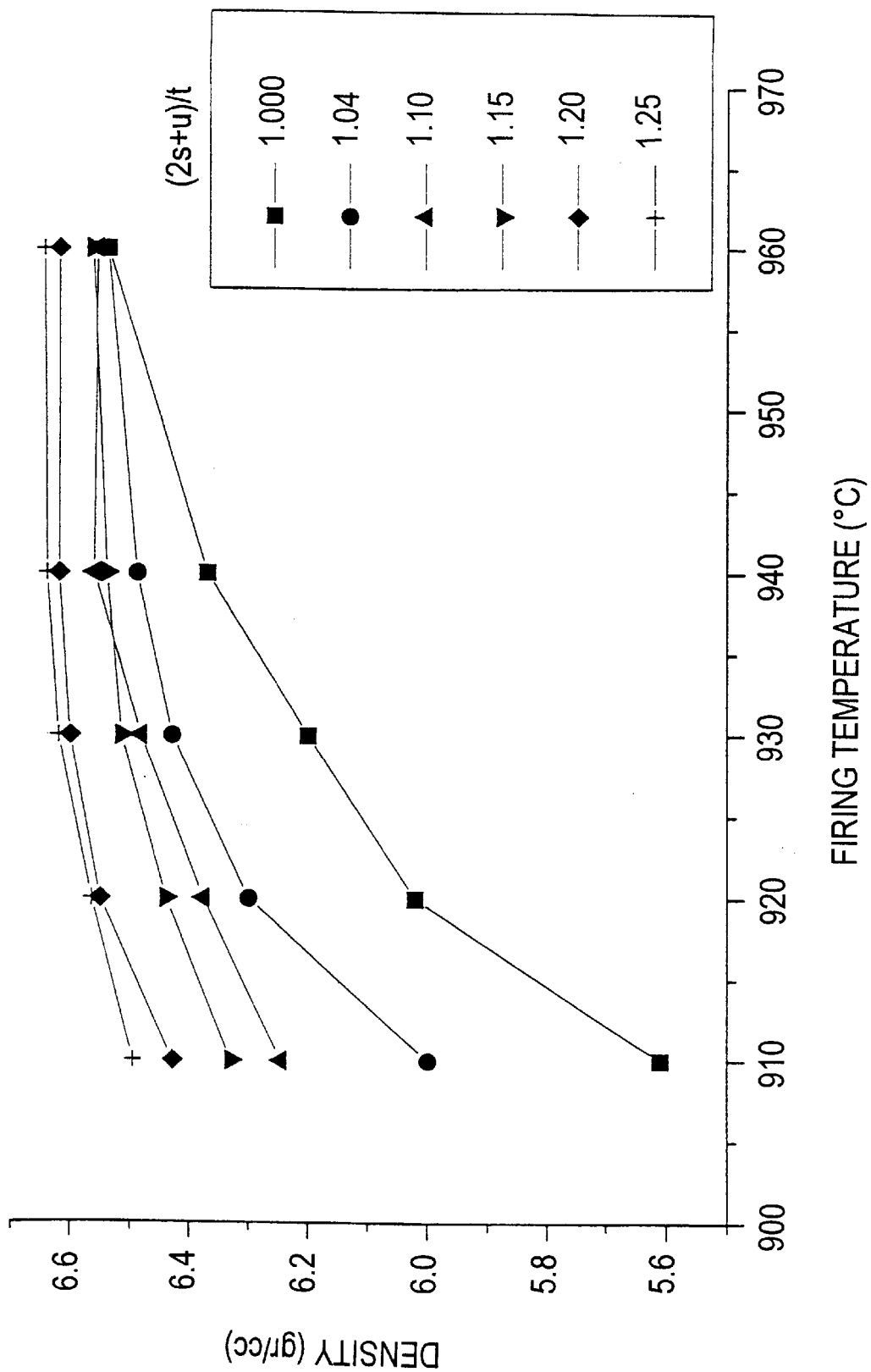
FIG. 1 is a graph showing specific relations between sintering temperatures from 910° C. to 960° C. and densities upon sintering in samples prepared from dielectric ceramic compositions having varying values of (2s+u)/t.

Preferred embodiments of the invention will now be explained at great length.

The dielectric ceramic composition of the invention has a sintering temperature of up to 950° C. and is composed mainly of a composite oxide of lead or Pb, calcium or Ca, tungsten or W and niobium or Nb, i.e., a composite perovskite compound having a composition represented by $$(Pb_{1-x}Ca_xO)_y(W_sFe_tNb_u)O_z$$

where x, y, s, t, u, and z are $0.3 \leq x \leq 0.9$ $1.000 \leq y < 1.020$ $1.03 \leq (2s+u)/t \leq 1.40$ $s+t+u=1$ $0.05 \leq s \leq 0.20$ $0.2 \leq u \leq 0.49$ $z = 3s + 5/2u + 3/2t$ The main component of the dielectric ceramic composition is a composite perovskite compound containing lead.

Referring here to (2s+u)/t or a charge balance-representing amount, U.S. Pat. No. 5,459,115 (EP 0 589 441 A1) shows that (2s+u)/t=1, and U.S. Pat. No. 5,565,391 (EP 0 625 492 A1) teaches that (2s+u)/t can be in the range of ca. 0.367 to ca. 1.78 although only unity is exemplified throughout the examples.

Herein Pb is partially replaced by Ca such that the molar fraction of calcium, x, is in the range: $0.3 \leq x \leq 0.9$. If the partial replacement by Ca exceeds the upper limit, low-temperature sinterability is lost. If the partial replacement by Ca is below the lower limit, the temperature coefficient τf of resonance frequency increases in a (+) direction.

The calcium molar fraction x is preferably in the range: $0.3 \leq x \leq 0.8$, and more preferably $0.4 \leq x \leq 0.75$, within which better low-temperature sinterability, a higher dielectric constant and a lower temperature coefficient τf of resonance frequency are available.

The molar fraction of $(Pb_{1-x}Ca_xO)$, y, is preferably in the range: $1.000 \leq y \leq 1.020$, and more preferably $1.005 \leq y \leq 1.015$.

It is not preferable that y<1.000 because it is difficult to carry out sintering. Even when y>1.020, it is again difficult to carry out sintering.

Here let s, t and u represent the molar fractions of W, Fe and Nb, respectively, provided that s+t+u=1. It is then preferable that $0.05 \leq s \leq 0.20$ $0.2 \leq u \leq 0.49$ The reasons for limitation of these molar fractions are described below. When s<0.05, low-temperature sinterability is adversely affected, and when s>0.2, the temperature coefficient τf of resonance frequency increases in a (+) direction. When u<0.2, the temperature coefficient τf of resonance frequency increases in a (+) direction, and when u>0.49, low-temperature sinterability is adversely affected. By limiting the molar fractions s and u to the aforesaid ranges a dielectric constant ε of at least 80 is achievable. In a preferred embodiment, a dielectric constant of 90 to 115, especially 100 to 110 is available.

The charge balance-representing amount (2s+u)/t is preferably $1.03 \leq (2s+u)/t \leq 1.40$, more preferably $1.04 \leq (2s+u)/t \leq 1.40$, and most preferably $1.10 \leq (2s+u)/t \leq 1.30$.

Thus, sinterability is strikingly improved by making the value of (2s+u)/t greater than 1.03. When (2s+u)/t<1.03, no high density is obtained upon sintering at low temperatures of up to 950° C. It is not preferable, however, that (2s+u)/t>1.40 because the temperature coefficient of dielectric constant is greater than 100 ppm/deg.

It is here desired that the aforesaid temperature coefficient τf be as close to zero as possible. In general, a temperature coefficient τf of resonance frequency between +100 ppm/° C. and −100 ppm/° C. is preferable for microwave dielectric material. In the present invention a temperature coefficient τf within ±100 ppm/° C. is obtainable, and in a preferred embodiment of the invention a temperature coefficient τf within ±60 ppm/° C., especially ±50 ppm/° C. is obtainable.

It is also desired that the aforesaid dielectric constant ε be as high as possible. For instance, resonator size is in inverse proportion to the square root of the dielectric constant of dielectric material, and so it is essential for the resonator size reduction to increase the value of ε. Therefore, it is of vital importance that ε has an increased value.

The presence of such a phase $(Pb_{1-x}Ca_xO)_y(W_sFe_tNb_u)O_z$ may be confirmed by an X-ray diffraction spectrum (XRD), usually with an average grain size of 0.5 to 15 μm, and especially 1 to 10 μm.

The dielectric ceramic material of the invention contains a sintering aid as a subordinate component so that it can be sintered at a lower temperature. The sintering aid used herein may generally be oxides such as ZnO, $Bi_2O_3$, CuO, PbO, and $PbSiO_3$. In the practice of the invention, however, it is particularly preferable to use lead germanate (that will be often referred to as PGO for short). By the incorporation of a given amount of PGO in the composite perovskite compound having the aforesaid range of composition it is thus possible to achieve a dielectric ceramic material whose Q value and dielectric constant are both high, and which can be sintered at a temperature much lower than the melting point of silver. The content of PGO used herein is, in wt %, $1.0 \leq w \leq 10.0$, and preferably $2.0 \leq w \leq 5.0$ where w is the weight fraction of PGO in the dielectric ceramic material. The addition of less than 1.0 wt % of PGO is substantially ineffective for low-temperature sintering or makes sintering difficult. When the amount of PGO is greater than 10.0 wt %, on the other hand, the temperature coefficient of dielectric constant exceeds 100 ppm/deg., with a Q.f value drop and a drop of its temperature property. Usually, the sintering aid remains at grain boundaries after sintering. $Pb_5Ge_3O_{11}$ is preferable for the aforesaid PGO. In the practice of the invention, it is also acceptable to use PGOs that are found to contain $Pb_5Ge_3O_{11}$ upon addition and may additionally contain phases such as $Pb_3Ge_2O_7$, and $Pb_3GeO_5$. That is, when PGO is represented by a(PbO)+b(GeO), it is preferable that the b/a ratio is approximately in the range: $0.16 \leq b/a \leq 3.0$.

Furthermore, the dielectric ceramic material of the invention may contain manganese or Mn in the form of an oxide, usually MnO. The Mn content, calculated as Mn, is up to 0.5 wt %, especially up to 0.4 wt %, and preferably 0.05 to 0.3 wt % based on the total weight of the aforesaid composite perovskite compound raw material (exclusive of the weight of the sintering aid). The addition of the Mn oxide improves the insulation resistance of material. The Mn oxide usually continues to exist in the aforesaid composite perovskite compound after sintering.

The method of producing a dielectric ceramic material according to the invention will now be explained. The starting raw materials include oxides of metal elements forming a main part of the dielectric ceramic material, for instance, lead oxide, calcium oxide, tungsten oxide, iron oxide, and niobium oxide. Alternatively, use may be made of compounds capable of being converted by sintering to oxides, for instance, carbonates such as calcium carbonate, and oxalates. The starting raw materials are mixed such that the proportion of the respective metal elements be identical with the final composition. The starting raw materials are generally in the form of particles having preferably an average particle size of about 0.5 to 10 $\mu$m. Some components may be added as a sulfate or nitrate solution.

Preferably, the starting raw materials in powder forms are wet mixed using a ball mill or the like. The mixture is then calcined. The mixing and calcining steps are done separately for two calcined products, a first calcined product or lead iron-tungstate $Pb(Fe_{2/3}W_{1/3})O_3$ (hereinafter PFW for short), and a second calcined product or partially-replaced-by-calcium lead iron-niobate $(Pb_{1-x}Ca_x)(Fe_{1/2}Nb_{1/2})O_3$ (hereinafter PCFN for short). The reason is that if the starting raw materials are mixed and calcined in one operation, it is then impossible to synthesize the final composition $(Pb_{1-x}Ca_xO)_y(W_sFe_tNb_u)O_z$ because of the ready formation of $CaWO_4$.

For the first calcined product or PFW it is preferable to use $PbO$, $Fe_2O_3$ and $WO_3$ as the starting raw materials, and for the second calcined product or PCFN it is preferable to use $PbO$, $Fe_2O_3$, $Nb_2O_5$ and $CaCO_3$ as the starting raw materials. The partial replacement of P (Pb) by C (Ca) in PCFN is preferably determined such that the molar fraction of calcium x falls in the range: $0.3 \leq x \leq 0.9$.

When the molar fraction of Ca is greater than 0.9, low-temperature sinterability is adversely affected. When the molar fraction of Ca is less than 0.3, on the other hand, the temperature coefficient $\tau f$ of resonance frequency increases in a (+) direction.

Especially when the aforesaid molar fraction x is $0.4 \leq x \leq 0.7$, better low-temperature sinterability is achievable with a dielectric constant increase and a decrease in the temperature coefficient $\tau f$ of resonance frequency.

Preferably, the aforesaid calcination is carried out at a temperature of about 800 to 900° C. for PFW and at a temperature of about 1,000 to 1,200° C. for PCFN, for a period of time of about 1 to 4 hours in either case. After calcination, it is preferable the calcined products are separately wet pulverized using a ball mill or the like to an average particle size of about 0.7 to 3.0 $\mu$m.

Then, the first calcined product or PFW is blended with the second calcined product or PCFN. Specifically, both the products are weighed, mixed, and calcined at such a proportion that a final composition represented by $(Pb_{1-x}Ca_xO)_y(W_sFe_tNb_u)O_z$ where x, y, S, t, u, and z are $0.3 \leq x \leq 0.9$ $1.03 \leq (2s+u)/t \leq 1.40$

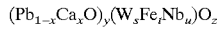

$0.05 \leq s \leq 0.20$ $0.2 \leq u \leq 0.49$ $1.000 \leq y < 1.020$ $z = 3s + 5/2u + 3/2t$ is obtained. It is preferable that the calcination is usually carried out in the atmosphere at a temperature of about 600 to 1,100° C., especially about 700 to 1,000° C., and more especially about 900 to 1,000° C. for about 1 to 4 hours. After the calcination, the calcined product is pulverized using a ball mill or the like to an average particle size of about 0.7 to 1.5 $\mu$m. The thus obtained, third calcined powder product having the composition $(Pb_{1-x}Ca_xO)_y(W_sFe_tNb_u)O_z$ will hereinafter be referred to as PCFNW for short.

Then, the sintering aid having a given particle size is obtained by wet mixing, for instance, PbO and $GeO_2$ preferably for about 14 hours at such a proportion that a preferable end composition $Pb_5Ge_3O_{11}$ is obtained, drying the mixture, calcining the dried mixture at about 500° C., and wet pulverizing the calcined mixture of $Pb_5Ge_3O_{11}$ using a ball mill or the like. This sintering agent such as $Pb_5Ge_3O_{11}$ is usually mixed with the calcined powder product prior to shaping.

In a preferable embodiment wherein manganese is contained in the form of an oxide, a manganese compound is added. The manganese compound includes oxides such as $MnO$, $MnO_2$ and $Mn_2O_3$ and compounds converted by sintering to oxides such as carbonates and oxalates. Also useful are composite oxides with another component, for instance, (Pb Ca)(Mn Nb)$O_3$ and (Pb Ca)$(Mn_{1/3}Nb_{2/3})O_3$ which are obtained by the addition of manganese to the first and second calcined products, respectively. These composite oxides are systems having manganese added to the first, and second calcined products. In the practice of the invention, either one of such composite oxides having an average particle size of about 0.1 to 1.0 $\mu$m may be used. Alternatively, a sulfate or nitrate solution may be added. The amount of the manganese compound added is generally up to 0.5 wt %, and especially 0.05 to 0.3 wt %, calculated as Mn, based on the total weight of PCFNW or $(Pb_{1-x}Ca_xO)_y(W_sFe_tNb_u)O_z$ plus PGO, i.e., the total weight of lead, calcium, tungsten, iron, and niobium oxides plus the sintering agent. The manganese compound may be added either at the same time as the sintering aid or in several portions.

Then, another process of obtaining the third calcined product or PCFNW is described below.

The starting raw materials used may be oxides forming a main part of the dielectric ceramic composition or various compounds capable of being converted by sintering to oxides, as mentioned above.

First, the second calcined product is synthesized. The starting raw materials in powder forms are preferably wet mixed together using a ball mill or the like. After mixing, the mixture is calcined to obtain the second calcined product. This PCFN is pulverized, and then mixed with oxides of lead, iron and tungsten or their compounds converted by sintering to oxides. The mixture is calcined and pulverized to obtain the third calcined product or PCFNW. This process is much more simplified than the aforesaid process, resulting in productivity improvements.

This second process is now explained at great length. For the starting raw materials, PbO, $Fe_2O_3$ and $WO_3$ are used as the oxides of lead, iron and tungsten or their compounds converted by firing to oxides, and PbO, $Fe_2O_3$, $Nb_2O_5$ and $CaCO_3$ are used for the second calcined product or PCFN. The partial replacement of P (Pb) by C (Ca) in PCFN is here determined such that the molar fraction of calcium x falls in the range: $0.3 \leq x \leq 0.9$, and especially $0.4 \leq x \leq 0.7$.

Preferably, the calcination for the aforesaid PCFN takes place at a temperature of about 1,000 to 1,200° C. for about 1 to 4 hours. After the calcination, the calcined product is preferably wet pulverized using a ball mill or the like to an average particle size of about 0.7 to 3.0 µm.

Then, oxides of lead, iron and tungsten or their compounds converted by firing to oxides are blended with the second calcined product or PCFN. Specifically, they are weighed, mixed, and calcined at such a proportion that a final composition represented by $$(Pb_{1-x}Ca_xO)_y(W_sFe_tNb_u)O_z$$

where x, y, s, t, u, and z are $0.3 \leq x \leq 0.9$ $1.03 \leq (2s+u)/t \leq 1.40$ $s+t+u=1$ $0.05 \leq s \leq 0.20$ $0.2 \leq u \leq 0.49$ $1.000 \leq y < 1.020$ $z = 3s + 5/2u + 3/2t$ is obtained. It is preferable that the calcination is usually carried out in the atmosphere at a temperature of about 600 to 1,100° C., especially about 700 to 1,100° C., and more especially about 900 to 1,100° C. for about 1 to 4 hours. After the calcination, the calcined product is pulverized using a ball mill or the like to an average particle size of about 0.7 to 1.5 µm. In this way, the third calcined product having the powder composition $(Pb_{1-x}Ca_xO)_y(W_sFe_tNb_u)O_z$ is obtained.

When the high-frequency dielectric ceramic material of the invention is applied as a dielectric device to a resonator, a vehicle containing an organic binder and an organic solvent is added to the aforesaid (third) calcined product to form a paste. Then, dielectric layers of this paste are stacked one upon another and co-sintered with conductor strips interleaved between them. Usually, it is preferable that co-sintering takes place in the atmosphere at a temperature of up to 950° C., especially up to 945° C. and more especially up to 940° C., but generally at least 910° C., especially at least 920° and more especially at least 930° C. for a holding time of 1 to 3 hours. Heating, and cooling rates per hour are not critical to the practice of the invention. Conductive material for internal electrode layers is preferably a low-resistance conductor material, for instance, a metal material such as silver or Ag, silver-palladium or Ag-Pd, silver-platinum or Ag-Pt, and gold or Au, among which silver or Ag is most preferred.

The dielectric device of the invention may be used for band-pass filters, duplexers and the like, to say nothing of resonators. It may also be applied to chip capacitors wherein dielectric layers and internal electrode layers are alternately stacked together and sintered before external electrodes are mounted thereon.

EXAMPLE

Examples of the present invention are given below by way of illustration and not by way of limitation.

Example 1

Given amounts of starting raw materials PbO, $Fe_2O_3$ and $WO_3$ were weighed, mixed, and calcined at about 850° C. for 2 hours to obtain a first calcimined product or PFW. Apart from this, given amounts of PbO, $CaCO_3$, $Fe_2O_3$ and $Nb_2O_5$ were weighed, mixed, and calcined at about 1,150° C. for 2 hours to obtain a second calcined product or PCFN. Each product was wet pulverized in a ball mill.

The first and second calcined products were weighed and blended together so as to give a final composition represented by $(Pb_{1-x}Ca_xO)_y(W_sFe_tNb_u)O_z$ wherein x, y, s, t, and u had such values as shown in Table 1, and then calcined at 600 to 1,000° C. for 2 hours. This calcination yielded a third calcined product having $(Pb_{1-z}Ca_z)(W_sFe_tNb_u)O_3$ (hereinafter often called PCWFN for short) as a main phase.

Then, the third calcined product or PCWFN obtained by calcination was wet pulverized in a ball mill into calcined powders having an average particle size of 0.9 µm (as measured by a laser diffractometry particle size distribution analyzer).

Separately, a sintering aid (hereinafter often called PGO for short) was obtained by wet mixing $Pb_5Ge_3O_{11}$ with given amounts of lead oxide or PbO and germanium dioxide or $GeO_2$ for 14 hours, drying the mixture, and heating the dried mixture at 500° C. for reaction. Then, the reaction product was wet pulverized in a ball mill to an average particle size of 0.9 µm.

Then, PGO having a chemical composition $Pb_5Ge_3O_{11}$ was added to the aforesaid PCWFN powders in the amount w, in wt %, shown in Table 1, wet mixed in a ball mill, and dried to obtain a final mixture. Optionally, MnO having an average particle size of 0.9 µm was added to the mixture in the amount, calculated as Mn, shown in Table 1.

Next, the aforesaid mixture was granulated with the addition of an organic binder polyvinyl alcohol thereto, and shaped at a pressure of 100 MPa to obtain a cylindrical compact of 12.5 mm in diameter and 10 mm in thickness.

The obtained compact was placed on a zirconia setter covered thereon with powders of the same component, and sintered in air at the temperature shown in Table 1 after removal of the binder in air. During the sintering process, the compact was sealed along with the calcined powders as a co-material in a casing to prevent the evaporation of lead from the compact. The sintered compact was machined to a diameter of 10 mm and a thickness of 5 mm. In this way, inventive dielectric sample Nos. 1 to 15 shown in Table 1 were obtained.

Sample Nos. 1 to 15 were all found to consist essentially of a single phase of PCWFN as determined by X-ray diffraction for phase system.

For the purpose of comparison, dielectric sample Nos. 16 to 23, shown in Table 1, were prepared from compositions departing from the composition range of the invention, as mentioned above.

The dielectric samples were measured for electrical properties, i.e., dielectric constant ε, Q.f value, resonance frequency $f_0$, and temperature coefficient τf of resonance frequency by a dielectric rod resonator method. The coefficient τf was calculated by measuring the resonance frequency at intervals of 20° C. from −40° C. to +80° C. and determining changes from the reference value at +20° C. The results are shown in Table 1.

TABLE 1

| Sample No. | $Pb_{1-y}Ca_y)_yW_uFe_tNb_sO_{z+y}$ | | | | | | | fcPGO | | | | | Specific |
| --- | --- | --- | --- | --- | --- | --- | --- | --- | --- | --- | --- | --- | --- |
| | x | y | u | s | (2s + u)/t | t | w | M n (wt %) | FT (°C.) | Density (gr/cc) | ε | Q f (GHz) | τ f (ppm/deg) | Resistance (Ω · cm) |
| 1 | 0.533 | 1.002 | 0.391 | 0.08 | 1.040 | 0.529 | 3 | 0.2 | 920 | 6.25 | 93.2 | 3420 | 44.7 | >1 × 10⁹ |
| 2 | 0.533 | 1.002 | 0.385 | 0.094 | 1.101 | 0.521 | 3 | 0.2 | 920 | 6.48 | 101.6395 | 3167 | 39.91268 | >1 × 10⁹ |
| 3 | 0.533 | 1.002 | 0.380 | 0.106 | 1.151 | 0.514 | 3 | 0.2 | 920 | 6.52 | 103.694 | 2987 | 47.51148 | >1 × 10⁹ |
| 4 | 0.533 | 1.002 | 0.375 | 0.118 | 1.202 | 0.508 | 3 | 0.2 | 920 | 6.6 | 107.0498 | 2800 | 52.92095 | >1 × 10⁹ |
| 5 | 0.533 | 1.002 | 0.370 | 0.129 | 1.252 | 0.501 | 3 | 0.2 | 920 | 6.62 | 108.4775 | 2686 | 63.66869 | >1 × 10⁹ |
| 6 | 0.533 | 1.002 | 0.365 | 0.14 | 1.303 | 0.495 | 3 | 0.2 | 930 | 6.72 | 112.3 | 2432 | 74.23 | >1 × 10⁹ |
| 7 | 0.533 | 1. | 0.385 | 0.094 | 1.202 | 0.521 | 3 | 0.2 | 930 | 6.6 | 107.0498 | 2800 | 44.5 | >1 × 10⁹ |
| 8 | 0.533 | 1.005 | 0.385 | 0.094 | 1.202 | 0.521 | 3 | 0.2 | 930 | 6.677 | 104.005 | 3024 | 57.6 | >1 × 10⁹ |
| 9 | 0.533 | 1.01 | 0.385 | 0.094 | 1.202 | 0.521 | 3 | 0.2 | 930 | 6.681 | 103.2 | 3120 | 60 | >1 × 10⁹ |
| 10 | 0.533 | 1.015 | 0.385 | 0.094 | 1.202 | 0.521 | 3 | 0.2 | 930 | 6.69 | 102.49 | 3176 | 60.2 | >1 × 10⁹ |
| 11 | 0.533 | 1.01 | 0.385 | 0.094 | 1.101 | 0.521 | 1.5 | 0.2 | 930 | 6.28 | 100.53 | 3120 | 39.2 | >1 × 10⁹ |
| 12 | 0.533 | 1.01 | 0.385 | 0.094 | 1.101 | 0.521 | 2 | 0.2 | 930 | 6.52 | 101.2 | 3200 | 45.3 | >1 × 10⁹ |
| 13 | 0.533 | 1.01 | 0.385 | 0.094 | 1.101 | 0.521 | 4 | 0.2 | 930 | 6.67 | 107.5 | 2852 | 52.4 | >1 × 10⁹ |
| 14 | 0.533 | 1.01 | 0.385 | 0.094 | 1.101 | 0.521 | 5 | 0.2 | 930 | 6.73 | 108.3 | 2932 | 64.3 | >1 × 10⁹ |
| 15 | 0.533 | 1.01 | 0.385 | 0.094 | 1.101 | 0.521 | 3 | 0 | 930 | 6.48 | 101.7 | 3120 | 40.3 | 4.6 × 10⁶ |
| 16* | 0.533 | 1.002 | 0.395 | 0.7* | 1.000* | 0.535 | 1 | 0.2 | 940 | 6.02 | — | — | — | >1 × 10⁹ |
| 17* | 0.533 | 1.002 | 0.348 | 0.094 | 1.504* | 0.471 | 3 | 0.2 | 920 | 6.71 | 118.2 | 2321 | 101.2 | >1 × 10⁹ |
| 18* | 0.533 | 0.995* | 0.385 | 0.094 | 1.202 | 0.521 | 3 | 0.2 | 940 | 5.7 | — | — | — | >1 × 10⁹ |
| 19* | 0.533 | 1.022* | 0.385 | 0.094 | 1.202 | 0.521 | 3 | 0.2 | 940 | 6.04 | — | — | — | >1 × 10⁹ |
| 20* | 0.533 | 1.025* | 0.385 | 0.094 | 1.202 | 0.521 | 3 | 0.2 | 940 | 5.9 | — | — | — | >1 × 10⁹ |
| 21* | 0.533 | 1.01 | 0.385 | 0.094 | 1.101 | 0.521 | 0* | 0.2 | 940 | 4.4743 | — | — | — | >1 × 10⁹ |
| 22* | 0.533 | 1.01 | 0.385 | 0.094 | 1.101 | 0.521 | 0.5* | 0.5 | 940 | 5.387 | — | — | — | >1 × 10⁹ |
| 23* | 0.533 | 1.01 | 0.385 | 0.094 | 1.101 | 0.521 | 12* | 0.5 | 930 | 6.72 | 98.6 | 2623 | 120.23 | >1 × 10⁹ |

*outside scope of the invention
FT: Firing temperature

Referring to the comparative examples shown in Table 1, sample No. 16 had a density of as low as 6.02 upon sintering, with (2s+u)/t<1.03. Sample No. 17 had a temperature coefficient of dielectric constant brought up to 100 ppm/deg., with (2s+u)/t>1.50. Sample No. 18 could not achieve any sufficient density upon sintering at a temperature of 920° C. because the value of y was smaller than 1.000. Both sample Nos. 19 and 20 could not achieve any preferable density upon sintering even at the respective sintering temperatures of 930° C. and 940° C., although the value of y was greater than 1.020. Both sample Nos. 21 and 22 could not achieve any sufficient density upon sintering even at a temperature of 930° C. because the value of w was 0 or 0.5, a figure smaller than 1.0 wt %. Sample No. 23 had a temperature coefficient of dielectric constant brought up to 100 ppm/deg., although the value of w was greater than 10 wt %.

The effectiveness of the invention is evident from the results mentioned above; according to the composition meeting the present invention and the production method of the invention there could be obtained a dielectric ceramic composition which has a low temperature coefficient τf of resonance frequency in the microwave range, a high dielectric constant ε and a high Q.f value, and is so sinterable at low temperature that it can be co-sintered with silver.

Example 2

Following sample Nos. 1, 2, 3, 4, 5 and 16 in Example 1, samples were prepared with the exception that (2s+u)/t was changed to 1.000, 1.04, 1.10, 1.15, 1.20 and 1.25, respectively. The samples were sintered every 10° C. between 910° C. and 960° C., and measured for densities upon sintering at the respective sintering temperatures. The obtained results are plotted in FIG. 1. FIG. 1 indicates that the sample with (2s+u)/t=1.04 within the range of the invention has sufficient densities upon sintering, as can be seen from a density of 6.2 gr/cc or more upon sintering at a temperature of 920° C., a density of 6.4 gr/cc or more upon sintering at a temperature of 930° C. and a density of 6.4 gr/cc or more upon sintering even at a temperature of 940° C. The sample with (2s+u)/t=1.10 is found to have a sufficient density upon sintering even at a temperature of 910° C., as can be seen from a density of 6.2 gr/cc or more upon sintering at a temperature of 910° C., a density of 6.3 gr/cc or more upon sintering at a temperature of 920° C. and a density of 6.4 gr/cc or more upon sintering at a temperature of 930° C. As (2s+u)/t increases from 1.15 via 1.20 to 1.25, the density upon sintering is improved. In comparative sample No. 16 with (2s+u)/t=1.000, on the other hand, a density upon sintering at a temperature of 910° C. was 5.6 gr/cc, a density upon sintering at a temperature of 920° C. was 6.0 gr/cc, and a density upon sintering at a temperature of 930° C. was 6.2 gr/cc or lower, all being less than satisfactory.

Example 3

An organic solvent, a polyvinyl butyral resin and a dispersant were mixed with PCFNW and PGO having the compositions for inventive sample No. 5 and comparative sample No. 16 prepared in Example 1, thereby obtaining a dielectric slurry A, and B.

Each of the obtained dielectric slurries was cast on a PET film using a doctor blade, dried, and released from the PET film to obtain a dielectric sheet of 200 μm in thickness. A silver paste obtained by mixing silver powders, ethyl cellulose and butyl Carbitol was printed on the thus obtained dielectric sheet by means of screen printing. Another dielectric sheet was stacked and heat pressed on the printed surface of the dielectric sheet to obtain a precursor block.

The thus obtained precursor block was cut along the printed pattern to obtain a sintering sample. This sintering sample was allowed to stand alone in air for removal of the organic solvent contained therein, sealed in a casing, and then sintered in air at the following sintering temperatures. The precursor block A for sample No. 5 was sintered at 920° C., and the precursor block B for sample No. 16 was sintered at 940° C. (because no sufficient density was obtained upon sintering at 920° C.).

Figure 2:
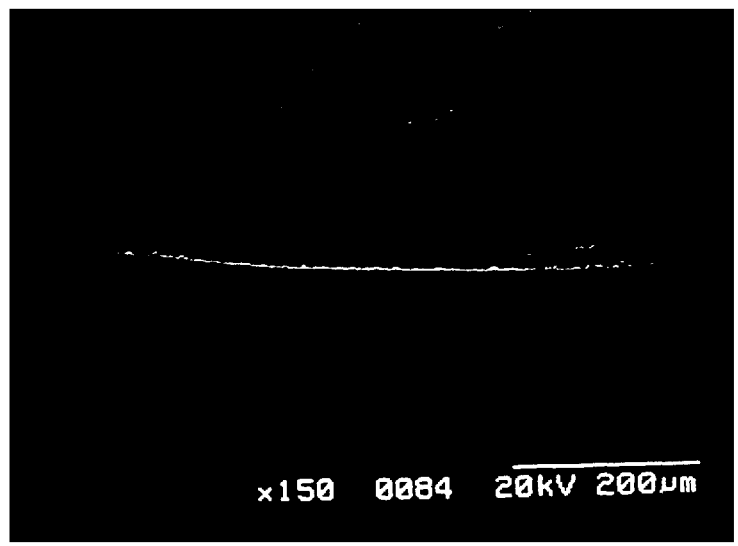
FIG. 2 is an SEM photograph taken of a section of a sintered body obtained by sintering the dielectric ceramic composition of the invention together with a silver conductor.
Figure 3:
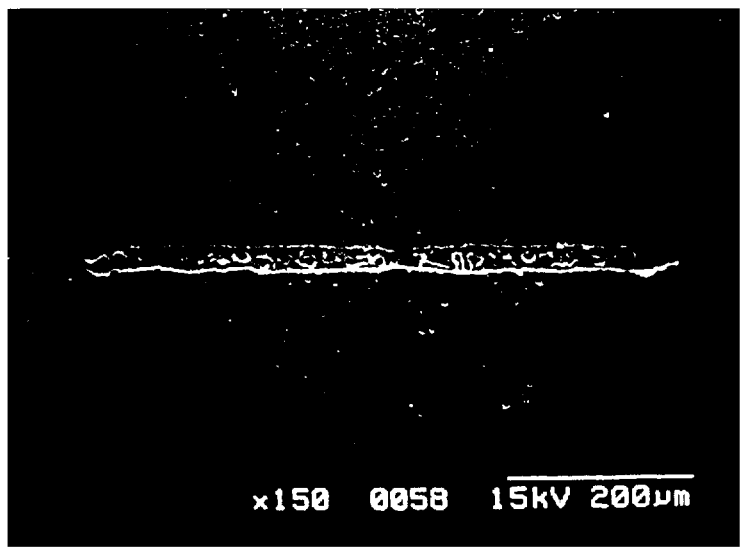
FIG. 3 is an SEM photograph taken of a section of sintered body obtained by sintering a comparative ceramic composition together with a silver conductor.

Each sintered sample was cut to expose a section including the silver conductor to view, and gold was deposited on the cut section by sputtering for observation under a scanning electron microscope (SEM). SEM photographs of the sintered bodies of the precursor blocks A and B are attached hereto in the form of FIGS. 2 and 3. From FIG. 2 it is found that the sintered body of the precursor block A shows a defect-free structure albeit being sintered at 920° C. As can be seen from FIG. 3, on the other hand, the sintered block of the precursor block B has a gap between the silver conductor and the dielectric material albeit being sintered at a high temperature of 940° C. Such a gap is responsible for a hopping phenomenon wherein, during a plating process for surface mounting, an electrolyte enters the gap and, upon heated to a high temperature at the reflow soldering step, expands and ruptures rapidly, causing product defects and performance loss.

Example 4

Following Example 1, given amounts of starting raw materials PbO, $CaCO_3$, $Fe_2O_3$ and $Nb_2O_5$ were weighed, mixed, and calcined at about 1,150° C. for 2 hours to obtain a second calcined product or PCFN, which was then wet pulverized in a ball mill to obtain a pulverized product. Then, given amounts of PbO, $Fe_2O_3$ and $WO_3$ were weighed, and blended and mixed with the pulverized product, and the mixture was calcined at 600 to 1,000° C. for 2 hours to obtain a third calcined product. Samples were prepared under otherwise similar conditions. The results were much the same as in Example 1.

According to the invention as explained above, there can be provided a dielectric ceramic composition which can be co-sintered with silver, and sintered at low temperature so that the evaporation of silver, excessive sintering, and the reaction of silver with dielectric ceramics can be avoided, and which has a Qf product of as high as 2,000 GHz or more, a dielectric constant of as high as 80 or greater, and has low loss and prevent the entrance of a plating bath thereinto.

Japanese Patent Application Nos. 353183/1996 and 127998/1997 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What we claim is:

1. A dielectric ceramic composition comprising a composite oxide of lead, calcium, tungsten, iron and niobium, wherein said composite oxide has a composition represented by $$(Pb_{1-x}Ca_xO)_y(W_sFe_tNb_u)O_z$$

where $0.3 \leq x \leq 0.9$, $1.000 \leq y < 1.020$, $1.03 \leq (2s+u)/t \leq 1.40$, $s+t+u=1$, $0.05 \leq s \leq 0.20$ $0.2 \leq u \leq 0.49$, and $z=3s+(5/2)u+(3/2)t$.

2. A dielectric ceramic material which is composed mainly of a composite oxide as recited in claim 1 with lead germanate added thereto, and has been sintered at up to 950° C.

3. The dielectric ceramic material of claim 2, which contains said lead germanate in an amount of 1 to 10 wt %.

4. The dielectric ceramic material of claim 3, wherein said lead germanate contains $Pb_5Ge_3O_{11}$.

5. The dielectric ceramic material of claim 1, which further contains manganese oxide in an amount of up to 0.5 wt %, calculated as manganese, based on a total weight of said composite oxide.

6. A dielectric device comprising a silver conductor pattern on the ceramic material of claim 2.

7. The dielectric ceramic composition of claim 1, wherein $1.04 \leq (2s+u)/t \leq 1.40$.

8. The dielectric ceramic composition of claim 1, wherein $1.10 \leq (2s+u)/t \leq 1.40$.

9. A method of producing a dielectric ceramic composition, the method comprising calcining a mixture of oxides of lead, iron and tungsten to form a first calcined product;

calcining a mixture of oxides of lead, calcium, iron and niobium to form a second calcined product; and calcining a mixture of said first calcined product and said second calcined product to form the dielectric ceramic composition of claim 1.

10. A method of producing a dielectric ceramic composition, the method comprising calcining a mixture of oxides of lead, calcium, iron and niobium to form a calcined product; and calcining a mixture of said calcined product with oxides of lead, iron and tungsten to form the dielectric ceramic composition of claim 1.

* * * * *